United States Patent [19]
Wilson

[11] Patent Number: 5,649,686
[45] Date of Patent: Jul. 22, 1997

[54] FLUSH VALVE REFILL HEAD FOR CONTROLLING FLOW DURING OPERATING CYCLE

[75] Inventor: John R. Wilson, Naperville, Ill.

[73] Assignee: Sloan Valve Company, Franklin Park, Ill.

[21] Appl. No.: 708,778

[22] Filed: Sep. 6, 1996

[51] Int. Cl.⁶ .................... F16K 31/145; F16K 31/385
[52] U.S. Cl. .................. 251/40; 138/40; 251/120
[58] Field of Search ................. 251/38, 40, 45, 251/46, 120, 121, 123; 138/40, 41, 42, 46

[56] References Cited

U.S. PATENT DOCUMENTS

| | | | |
|---|---|---|---|
| 1,830,005 | 11/1931 | Sloan | 251/40 |
| 2,122,189 | 6/1938 | Ward | 251/40 |
| 2,210,860 | 8/1940 | Regnell | 251/40 |
| 2,369,104 | 2/1945 | Fredrickson | 251/40 |
| 2,433,507 | 12/1947 | Delany | 251/40 |
| 3,656,499 | 4/1972 | Nelson et al. | 251/40 |
| 5,013,007 | 5/1991 | Whiteside | 251/40 |
| 5,150,877 | 9/1992 | Whiteside et al. | 251/40 |
| 5,332,192 | 7/1994 | Whiteside | 251/40 |
| 5,335,694 | 8/1994 | Whiteside | 251/40 |

*Primary Examiner*—George L. Walton
*Attorney, Agent, or Firm*—Dorn McEachran Jambor & Keating

[57] ABSTRACT

A flush valve for use on toilet devices such as urinals and water closets has a body with an inlet and an outlet and a connecting passage. There is a valve seat at one end of the passage and a diaphragm is positioned to control the flow of water through the passage and close upon the valve seat. A guide member is attached to the underside of the diaphragm and positioned within the passage. There is a refill ring attached to the guide member. The refill ring has an upstream end which is peripherally spaced from the passage when the diaphragm is closed on the valve seat. The refill ring has a downstream water flow control portion having a plurality of first water flow paths which, when the diaphragm is away from the valve seat, provide the major water flowway between the inlet and the outlet. The refill ring water flow control portion has a plurality of second water flow paths, parallel with the first water flow paths, which are formed to provide a smaller volume of flow than said first water flow paths.

18 Claims, 2 Drawing Sheets

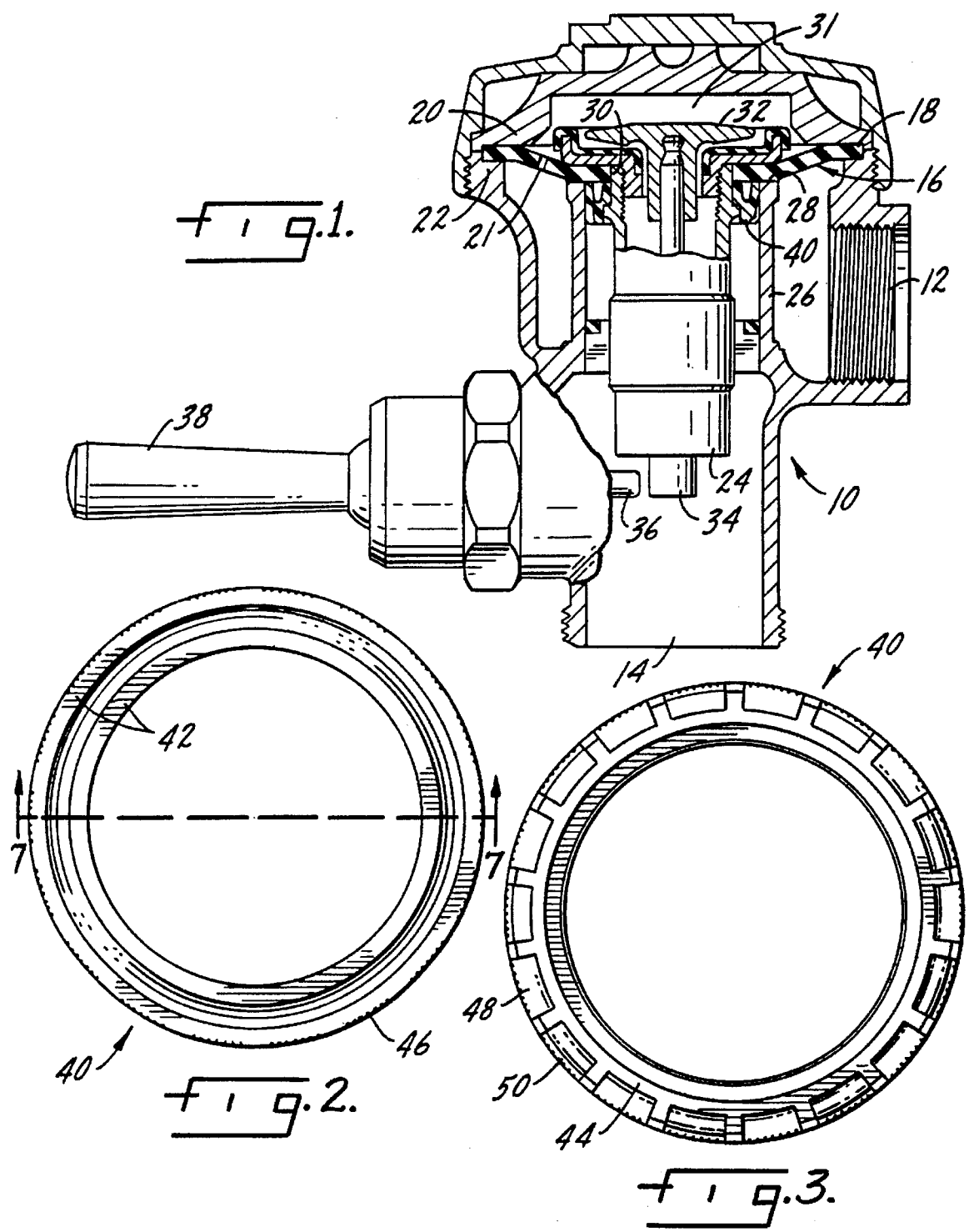

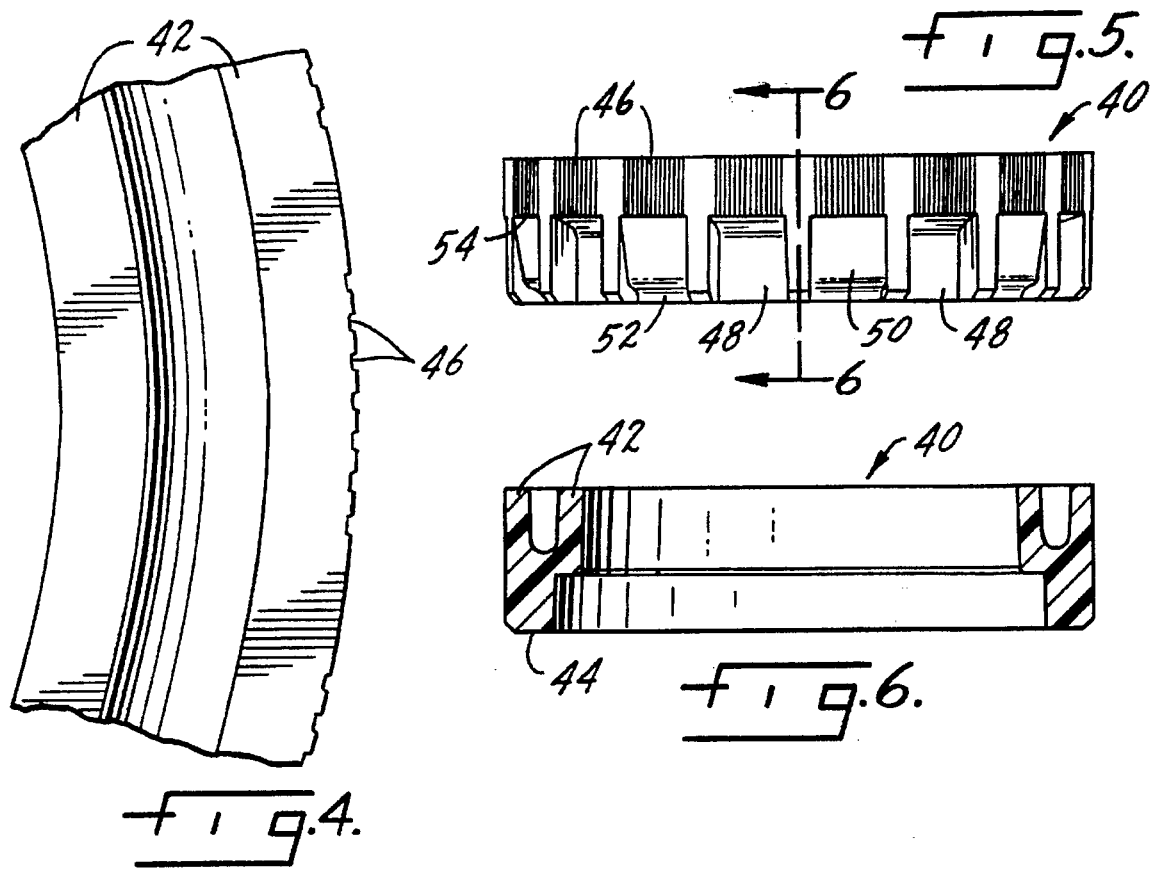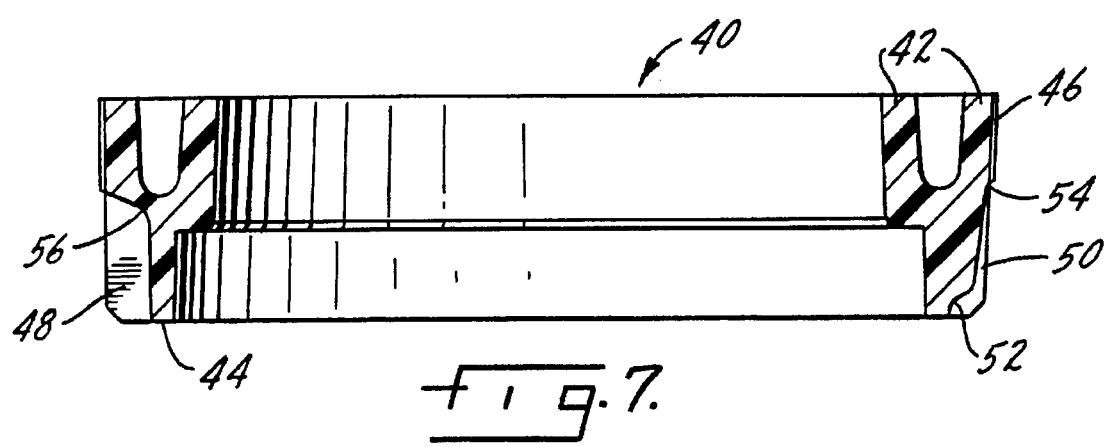

FLUSH VALVE REFILL HEAD FOR CONTROLLING FLOW DURING OPERATING CYCLE

THE FIELD OF THE INVENTION

The present invention relates to flush valves of the type commonly found in public washrooms and more particularly to the refill ring which controls the flow of water through the flush valve during its operation. The present invention is specifically concerned with a refill ring which can be used, in combination with variation in the stroke of the flush valve diaphragm, to accurately control the volume of water passed by the flush valve during the flushing cycle.

THE RELATED PRIOR ART

U.S. Pat. No. 3,656,499, owned by Sloan Valve Company, the assignee of the present application, shows an early form of refill ring and one which has been in common use in flush valves for a substantial number of years. The refill ring in the '499 patent was expensive to manufacture and difficult to hold to tolerance. U.S. Pat. No. 5,013,007, also owned by Sloan Valve Company, discloses a refill ring which is designed to eliminate both vibration and noise during operation of the flush valve and water hammer at closure of the flush valve. U.S. Pat. No. 5,150,877, owned by Sloan Valve Company, discloses a refill ring which has peripheral contact with the flush valve guide or barrel to avoid vibration and noise. This ring, however, added friction to movement of the flush valve diaphragm with the result that the valve could possibly be held open at low water pressures.

SUMMARY OF THE INVENTION

The present invention relates to refill rings for use in flush valves of the type commonly found in public washrooms and more specifically to improvements in the refill ring which permit substantially improved control over the volume of water used in a single cycle of flush valve operation.

A primary purpose of the invention is a refill ring having water flow control paths, the size and shape of which can be used to closely control the volume of water used in a single flushing cycle.

Another purpose is a refill ring of the type described which eliminates side loads on the ring which can result in excessive wear and damage to the flush valve.

Another purpose of the invention is a refill ring which prevents a pressure gradient on the ring which can result in improper flush valve operation.

Another purpose is a refill ring as described which insures that the valve will not be hung up in an open position and which insures a repeatable flow pattern for water passing through the flush valve.

Another purpose is a refill ring which permits accurate variation of flush valve volume by minor changes to the stroke of the flush valve diaphragm.

Other purposes will appear in the ensuing specification, drawings and claims.

BRIEF DESCRIPTION OF THE DRAWINGS

The invention is illustrated diagrammatically in the following drawings wherein:

FIG. 1 is an partial axial section through a flush valve of the type described showing the improved refill ring of the present invention;

FIG. 2 is an enlarged top view of the refill ring of FIG. 1;

FIG. 3 is an enlarged bottom view of the refill ring of FIG. 1;

FIG. 4 is an enlarged partial top view of the refill ring illustrating the peripheral water passages;

FIG. 5 is a side view of the refill ring,

FIG. 6 is a section along plane 6—6 of FIG. 5; and

FIG. 7 is a section along plane 7—7 of FIG. 2.

DESCRIPTION OF THE PREFERRED EMBODIMENT

U.S. Pat. No. 3,656,499, assigned to the assignee of the present invention, describes a diaphragm-type flush valve and a refill ring for use in that flush valve which has been in commercial use for a number of years. The refill ring was specifically designed to quiet the closure of the diaphragm upon its seat during operation of the flush valve. The exterior of the refill ring has a plurality of grooves which are designed to reduce water turbulence during closure of the diaphragm assembly and there is an annular space about the periphery of the refill ring which forms a passage between the interior of the flush valve barrel and the exterior of the refill ring. As the diaphragm assembly is closed, water flow through this passage, with the grooves which form the interior wall of the passage functioning to reduce turbulence and thus noise. The presence of a very large number of vertical grooves in the periphery of the refill ring made the part expensive to manufacture and difficult to hold to tolerance. The result was that the flow of water past the refill ring during closure varied greatly, because of the difficulty of precisely controlling the size of the passage about the exterior of the refill ring.

U.S. Pat. No. 5,013,007 was an improvement on what is shown in the '499 patent and there were a plurality of areas of circumferential contact between the refill ring and the interior of the flush valve barrel, something not present in the '499 patent. However, the recesses which form the water passages in the refill ring of the '007 patent were constant in shape and cross section, which caused the water flow pattern through the refill ring to be more abrupt than desired.

U.S. Pat. No. 5,150,877 showed a further form of refill ring in which there were a plurality of water flow passages which were defined by fins which were in contact with the inside of the flush valve barrel. The purpose of such contact was to avoid vibration noise. It was found, however, that the additional friction added to diaphragm movement during operation of the flush valve made it possible for the flush valve to be hung up in an open position at low water pressures.

The refill ring of the present invention overcomes the problems of the various prior art refill rings in terms of providing a repeatable and accurate control of water flow through the flush valve from the beginning to the end of the flushing cycle. Further, it is possible with small changes in the stroke of the flush valve diaphragm to provide flush valves which will accurately operate at different flow rates.

In the drawings, a flush valve body is indicated generally at 10 and has an inlet 12 and an outlet 14. The diaphragm assembly is indicated generally at 16 and includes a flexible diaphragm 18 clamped about its periphery between an internal cover 20 and a shoulder 22 formed in the flush valve body 10. A guide member 24 is attached to the diaphragm and extends within a barrel 26 of the flush valve, the barrel forming a passage between the inlet and the outlet. At the top of the barrel, there is a seat 28 upon which the diaphragm assembly closes.

The diaphragm is provided with a central opening 30 within which is positioned a relief valve 32, the lower end of which, indicated at 34, is positioned for contact by plunger 36. As is well known in the art, plunger 36 is operated by movement of handle 38. There is a pressure chamber 31 above the diaphragm which functions to hold the diaphragm upon its seat until the chamber is vented by relief valve 32. A refill orifice 21 is used to fill chamber 31 after it is vented. The description and function of the flush valve are more fully described in U.S. Pat. No. 3,656,499 and the other patents referenced above, and those disclosures are herein incorporated by reference.

The stroke of the diaphragm which may determine the volume of water flowing through the flush valve during operation is fixed by the relative positions of the lower end of the relief valve, indicated at 34, and the plunger 36. Movement of the plunger, as caused by movement of handle 38, causes the relief valve 32 to move off its seat, venting the pressure in chamber 31 above the diaphragm. The diaphragm moves up a distance which is sufficient for the lower end 34 of the relief valve to clear plunger 36. The relief valve will then return to its closed vertical position, as shown in FIG. 1, and the upward stroke of the diaphragm will be completed. The diaphragm will then start to move down toward a closed position as shown in FIG. 1. To lengthen the stroke of the diaphragm it is necessary to lengthen the relief valve. To shorten the stroke, the length of the relief valve is shortened.

The stroke of the diaphragm determines the time period during which water will flow, but since the diaphragm is made of rubber, it is not desirable to unduly stretch it. For this reason, it is preferred to limit the stroke of the diaphragm, but yet be able to obtain a substantial range of water flow rates through the flush valve. The present invention provides this advantage by a unique arrangement of water flow paths through the flush valve refill ring, as will be described. Diaphragm stroke will be changed to control flow, but the range of diaphragm movement or stroke may be limited with precise control of flow rate being determined by the refill ring.

The refill ring is indicated generally at 40 and may be formed of a suitable plastic material, for example Delrin or Celcon. The ring is generally cylindrical in form and has an upstream portion 42 and a downstream portion 44. The upstream portion 42 is peripherally spaced, when the refill ring is in the closed position of FIG. 1, from the interior or inside of the barrel 26. The space is small, but there is room for water to flow in this area during the closing portion of the flush cycle. The upstream portion 42 has a plurality of shallow closely spaced small grooves 46 which are arranged in sets with each of the sets corresponding to one of the water flow paths to be described.

The grooves 46 insure that there will always be some water flow peripherally about the refill ring when the flush valve is in the closing portion of its cycle. This presents a pressure gradient from forming between one side of the barrel and the directly opposite portion of the refill ring. Such a pressure gradient may tend to cant or tilt the diaphragm assembly 16, permitting the valve to hang up in an open position. Also, such a pressure gradient can place a substantial side load on the refill ring, causing excessive wear between one side of the ring and the interior of the barrel. Further, the flow pattern can be altered if the refill ring does not have peripheral flow and such an altering of the flow pattern not only may cause noise, but more importantly, may prevent precise control of water volume during the flushing cycle. In present-day water supply systems and china it is mandated that flush valves have a very precisely controlled volume of water for a single flush and this volume may vary depending upon the location or the municipality and it may vary between urinals and water closets.

The downstream portion 44 of the refill ring has a plurality of first flow paths formed by notches 48 which, as shown in the left side of FIG. 7, have a generally constant flow area throughout their length. The termination of the upstream end of the notches 48 is formed by a radius indicated at 56. This is desirable in providing a smooth transition from the flushing or siphon portion of the flush valve water flow cycle to the refill portion of the water flow cycle.

Positioned between adjacent notches 48 are notches 50 which have a varying flow path. Note particularly the right side of FIG. 7. The flow path in notches 50 will vary from a maximum flow at the downstream end of the notch, indicated at 52, to a substantially reduced flow at the upstream end of the notch indicated at 54. As shown herein, there are an equal number of first flow paths formed by the notches 48 and second flow paths formed by the notches 50. This is not necessary in every application, nor is it necessary that there be a second flow path between every pair of first flow paths. The embodiment described herein is exemplary of the concept of having parallel flow paths of varying volume in a refill ring, which flow paths have different functions in the overall flushing cycle to control the volume of water flow.

In a typical operating cycle of the flush valve, movement of handle 38 will cause plunger 36 to tilt relief valve 32, venting the pressure in chamber 31, permitting the diaphragm to rise. Water can then flow from inlet 12, about the exterior of the refill ring 40 to outlet 14. As the diaphragm and the refill ring rise during the upstroke of the diaphragm, the water flow paths 48 and 50 are exposed to water flowing from inlet 12. The major portion of water flow through the flush valve during the siphon portion of the cycle is through flow paths 48. The volume that flows through these flow paths will be determined by the stroke of the diaphragm which in turn is determined by the length of the relief valve portion 34 and its relative position to plunger 36. Water flow can be controlled relatively precisely by the stroke of the diaphragm. However, as indicated above, it is desired to limit the degree of diaphragm movement so as to prevent excessive wear to this component. Passages 50 provide a further flow path through the refill ring. Flow of water through passages 50 will be cumulative to the major portion of water flow through paths 48, with the amount of the additional flow through flow paths 50 being determined again by stroke. A smaller portion of the water flow during the siphon portion of the cycle will pass through flow paths 50, but since these flow paths have a gradually increasing volume, with an increase in stroke, the combination of the water through the two flow paths can be used to provide a larger and controlled water flow volume at a smaller stroke of the diaphragm.

As the diaphragm begins the closing portion of its cycle, water flow is dramatically lessened when the flow paths 48 and 50 pass down below seat 28. The transition between the siphon portion of the flush valve cycle and the refill portion, when the bowl is refilled with water, takes place when the flow paths 48 and 50 pass below seat 28. This transition can be softened to reduce noise by the use of the curved transition area 56. Once the flow paths 48 and 50 have passed beneath seat 28, further water flow is between the upstream portion 42 of the refill ring and the inside of barrel 26. This portion of water flow is peripheral about the refill ring and will be in the gap between these two elements as well as in the small grooves 46 in the upstream end of the refill ring.

During the closing portion of the water flow cycle, as soon as the relief valve 32 has returned to its seated position as shown in FIG. 1, water will begin to flow through the refill orifice 21 into the chamber 31 above the diaphragm. Pressure in this chamber will cause the diaphragm to close completing the flush valve cycle.

Whereas the preferred form of the invention has been shown and described herein, it should be realized that there may be many modifications, substitutions and alterations thereto.

The embodiments of the invention in which an exclusive property or privilege is claimed are defined as follows:

1. In a flush valve, a body having an inlet and an outlet, a passage connecting the inlet and outlet, a valve seat at one end of the passage, a diaphragm positioned to control the flow of water through said passage and to close upon said seat, a guide member attached to the underside of said diaphragm and positioned within said passage, a refill ring attached to said guide member, said refill ring having an upstream end which is peripherally spaced from said passage when said diaphragm is closed on said valve seat, said refill ring having a downstream water flow control portion having a plurality of first water flow paths which, when the diaphragm is above said valve seat, provide the major water flowway between the inlet and outlet, said refill ring water flow control portion having a plurality of second water flow paths, parallel with said first water flow paths, which second water flow paths, are formed to provide a smaller volume of flow than said first water flow paths, said second water flow paths having a gradually decreasing flow area from the downstream end of said refill ring toward the upstream end of said refill ring.

2. The flush valve of claim 1 further characterized in that the stroke of said diaphragm in moving between open and closed positions determines the maximum flow rate through said second water flow paths.

3. The flush valve of claim 1 further characterized in that the stroke of said diaphragm in moving between open and closed positions essentially determines the volume of flow through said first water flow paths.

4. The flush valve of claim 1 further characterized in that each complete flow cycle of said flush valve, as determined by the stroke of said diaphragm in moving from a closed position to an open position and back to a closed position, includes a refill flow portion in which there is essentially no water flow through said first and second flow paths, with water only flowing between the upstream end of said refill ring and said passage.

5. The flush valve of claim 1 further characterized in that the upstream end of said refill ring includes a plurality of closely spaced shallow axially extending grooves.

6. The flush valve of claim 5 further characterized in that said grooves terminate at the start of said first and second flow paths.

7. The flush valve of claim 6 further characterized in that said grooves are formed in sets, with each set of grooves being aligned with one of said first and second flow paths.

8. The flush valve of claim 1 further characterized in that said first water flow paths have a generally constant flow area.

9. The flush valve of claim 1 further characterized in that there are an equal number of first water flow paths and second water flow paths.

10. The flush valve of claim 1 further characterized in that said first and second water flow paths are generally uniformly arranged about the periphery of said refill ring.

11. A refill ring for use in a diaphragm-type toilet device flush valve, said refill ring having an upstream portion and a downstream portion, said downstream portion having a plurality off first water flow paths which provide the major water flowway when the flush valve is open, said downstream portion having a plurality of second water flow paths, parallel with said first water flow paths, which second water flow paths provide a smaller volume of flow than said first water flow paths, said second water flow paths having a gradually decreasing flow area from the downstream end of said refill ring toward the upstream end of said refill ring.

12. The refill ring of claim 11 further characterized in that said second water flow paths determine the maximum flow rate through said flush valve.

13. The refill ring of claim 11 further characterized in that said first water flow paths have a generally constant flow area.

14. The refill ring of claim 11 further characterized in that there are an equal number of first water flow paths and second water flow paths.

15. The refill ring of claim 11 further characterized in that said first and second water flow paths are uniformly arranged about the periphery of said refill ring.

16. The refill ring of claim 11 further characterized by and including a plurality of closely spaced shallow axially extending grooves peripherally arranged about the upstream portion of said refill ring.

17. The refill ring of claim 16 further characterized in that said grooves terminate at the start of said first and second flow paths.

18. The refill ring of claim 17 further characterized in that said grooves are arranged in sets, with each set of grooves being aligned with one of said first and second flow paths.

* * * * *